March 5, 1929.  G. CUGLEY  1,704,559
THERMOMETER FOR INCUBATORS
Filed Aug. 12, 1921
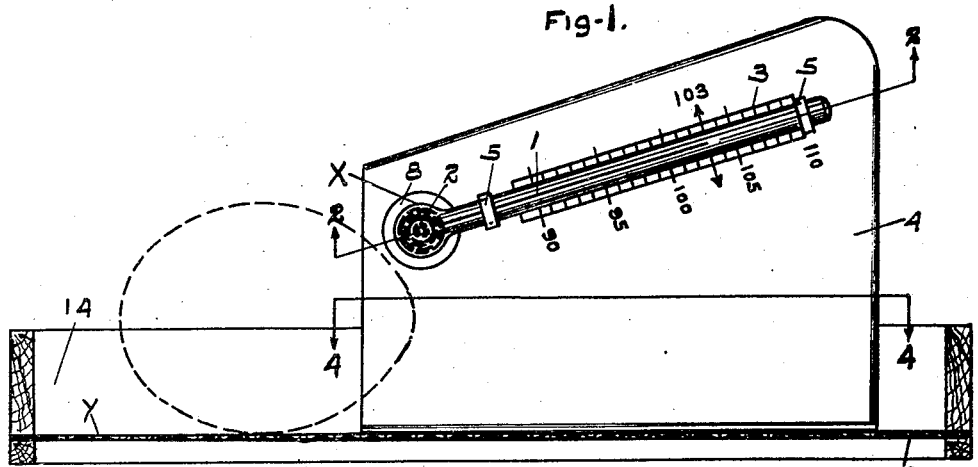
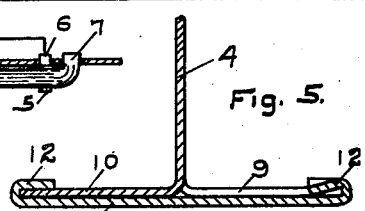
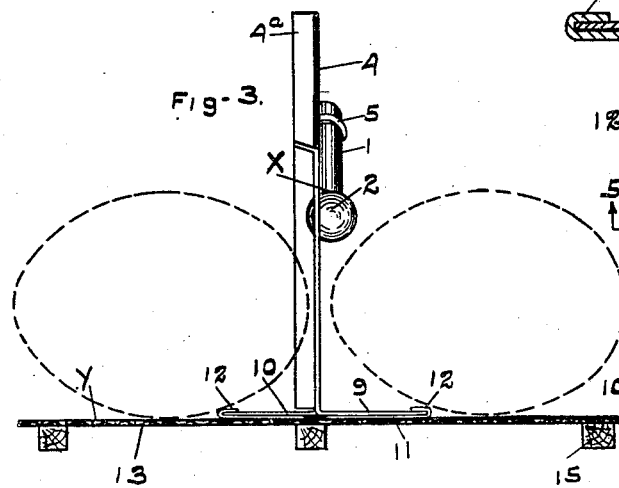
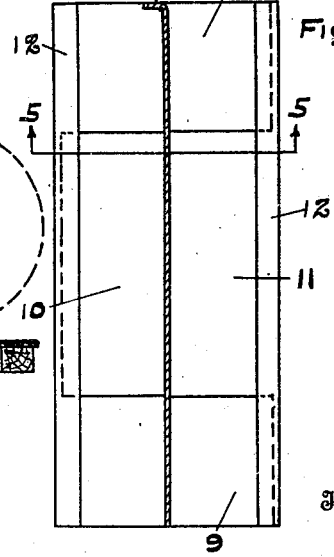
Witness
Inventor
George Cugley
By Percy Norton
Attorney Patented Mar. 5, 1929.

1,704,559

UNITED STATES PATENT OFFICE.

GEORGE CUGLEY, OF SPRINGFIELD, OHIO, ASSIGNOR TO THE BUCKEYE INCUBATOR COMPANY, OF SPRINGFIELD, OHIO, A CORPORATION OF OHIO.

THERMOMETER FOR INCUBATORS.

Application filed August 12, 1921. Serial No. 491,743.

My invention relates to thermometers for incubators and the object of my invention is to provide a simple and efficient device whereby the tube bulb of the thermometer will have a fixed position in its relation to the eggs.

The elevation of the bulb in its relation to the eggs is absolutely essential and the devices heretofore known have been subject to such variations seriously affecting the hatch that I have sought and found a simple means to support the bulb in correct position that is fool proof in the hands of a careless operator.

It is well known that the best results are obtained when the eggs are held in a temperature of 103 degrees, and I have found the greatest efficiency is attained by placing the thermometer with the top of its tube bulb 1¾ inches above the floor of the egg tray.

Heretofore thermometers have been supplied either requiring some adjustment of the holder by the operator or that he attach and secure it to the egg tray with the result that in the hands of a careless operator the elevation of the tube bulb would vary and seriously affect the efficiency of the hatch.

In all incubators in so far as applicant is aware the eggs are placed upon the screen floor of the egg tray so that in solving the problem of providing means to support the tube bulb at a fixed elevation in its relation to the egg, I have discovered a device that can be employed in any make of incubator and this I have attained by providing a support having a sufficient base to be seated on the floor of an egg tray and maintain itself in an upright position with the top of the tube bulb 1¾ inches above the floor of the egg tray.

It will be seen that a thermometer having a support made in this way can be employed with absolute accuracy in any make of incubator; and that it is fool proof in the hands of a careless operator.

A further object of my invention is to so arrange the thermometer that it will require less space vertically and this I accomplish by placing the tube and its scale at an inclination to the perpendicular.

A further object is to so mark the scale at 103 degrees that it can be easily read when at the correct temperature.

A further object is to provide a support that can be easily produced in great quantities at a minimum cost.

In the accompanying drawings which form a part of this specification Fig. 1 is a side elevation of a thermometer seated on the floor of an egg tray of an incubator, the tray being shown in section with the outline of an egg resting on the floor to indicate its position in relation to the tube bulb of a thermometer, the device as shown embodying my invention. Fig. 2 is a section on the line 2—2 of Fig. 1. Fig. 3 is an end view taken at right angles to Fig. 1. Fig. 4 is a section on the line 4—4 of Fig. 1 and Fig. 5 is a section on the line 5—5 of Fig. 4.

Like numerals represent the same parts in the several views.

In the drawings 1 represents a thermometer tube, 2 the tube bulb, 3 a scale and 4 a support for same, said tube and scale being preferably disposed thereon at an inclination to the perpendicular as shown; and said tube and bulb are secured to said support by straps 5, the ends 6 of which extend through perforations in the support and are bent back against the opposite side thereof. An extension 7 of the tube projects through an opening in the support to hold the tube against longitudinal movement and the tube bulb extends into an opening 8 of the support. The scale is specially marked with a double arrow at 103 degrees for easy reading.

The support 4 is preferably made of sheet metal having flanges 4ª and is cut to form extensions 9 and 10, the extension 9 being bent at right angles to the sheet in one direction and the extension 10 being bent at right angles to the sheet in the opposite direction. A base plate 11 is provided, opposite edges 12 of which are flanged over and bent tightly against the outer edges of the extensions 9 and 10 of the support forming a light strong base of sufficient dimensions to maintain the support in an upright position when seated on the floor 13 of an egg tray 14, said tray resting on cross bars 15 of an incubator not shown. The base plate flanges 12 are also bent tightly against the plate between the extensions 9 and 10 to prevent end movement. It will be seen that the support and its base being made of sheet metal affords maximum space for the eggs as particularly shown in Fig. 3.

I have shown the top of the tube bulb and the top of the egg at the same elevation above the floor of the egg tray; but as the eggs will vary somewhat in size I have found as hereinbefore stated that the greatest efficiency is obtained when the top $x$ of the bulb is 1¾ inches above the surface $y$ of the floor of the egg tray. The elevation given applies to eggs of the ordinary variety of domestic or barnyard hen as found generally on the market; but for other varieties which on the average are larger or smaller the elevation will be proportionately greater or less.

While I have given the elevation of the bulb above the floor of the egg tray at which the greatest efficiency is obtained, I do not wish to limit myself to the exact elevation stated since this may be slightly varied and yet come within the spirit of my invention.

Having thus described my invention, I claim:

A thermometer for incubators, said thermometer having a tube with a bulb and a support therefor composed of a vertical sheet having horizontal extensions, and a base sheet flanged over said extension and tightened in place between two of said extensions to prevent end movement, said base adapted to be freely seated on the same floor upon which the eggs rest and maintain said bulb in a prescribed fixed position in its relation to the eggs substantially as set forth.

In testimony whereof I have hereunto affixed my signature.

GEORGE CUGLEY.